United States Patent [19]
Ellqvist et al.

[11] Patent Number: 5,931,047
[45] Date of Patent: Aug. 3, 1999

[54] INDUSTRIAL ROBOT

[75] Inventors: Staffan Ellqvist; Ove Kullborg, both of Vasteras, Sweden

[73] Assignee: Asea Brown Boveri AB, Vasteras, Sweden

[21] Appl. No.: 08/914,802

[22] Filed: Aug. 15, 1997

[30] Foreign Application Priority Data

Feb. 10, 1997 [SE] Sweden ................................. 9700436

[51] Int. Cl.$^6$ .............................. B25J 17/02; B25J 18/00
[52] U.S. Cl. ..................................... 74/490.01; 74/490.06; 427/453; 901/29; 901/42
[58] Field of Search ................ 74/490.01, 490.06; 901/42, 29; 204/192.12, 192.15; 427/453

[56] References Cited

U.S. PATENT DOCUMENTS

| | | | |
|---|---|---|---|
| 3,806,691 | 4/1974 | Roach | 219/69 G |
| 4,320,931 | 3/1982 | Shaffer | 308/237 R |
| 4,507,534 | 3/1985 | Kaufmann et al. | 219/86.7 |
| 4,636,135 | 1/1987 | Bancon | 414/730 |
| 4,664,588 | 5/1987 | Newell et al. | 414/730 |
| 4,830,569 | 5/1989 | Jannborg | 414/729 |
| 5,643,696 | 7/1997 | Rowlette | 429/210 |

FOREIGN PATENT DOCUMENTS 2 277 205 of 1994 United Kingdom.

*Primary Examiner*—Allan D. Herrmann
*Attorney, Agent, or Firm*—Pollock, Vande Sande & Amernick

[57] ABSTRACT

An industrial robot comprises a plurality of robot arms which are movable in relation to each other and support a tool holder. The tool holder comprises an output shaft journal, to which a turning disc is attached. To electrically insulate a tool applied to the tool holder and the robot, an insulating layer is arranged between the turning disc and the shaft journal.

5 Claims, 2 Drawing Sheets

INDUSTRIAL ROBOT

TECHNICAL FIELD

The present invention relates to a wrist for an industrial robot. More particularly, the invention relates to a turning disc of a tool holder for a welding robot.

BACKGROUND OF THE INVENTION

An industrial robot usually comprises a number of arms movable in relation to each other and which together support a tool holder. An industrial robot of this type is shown, for example, in the U.S. Pat. No. 4,507,534. To the tool holder there are applied tools suited for the tasks that the robot is intended to carry out. For welding applications, for example, a spot welding gun is applied to the tool holder of the robot. One problem in this connection is that leakage currents from the welding equipment may be passed through the robot. Such leakage currents through the robot may damage particularly the bearings for the movable arms of the robot. The damage appears as craters in the bearing races and leads to extensive and time-wasting repairs. The welding gun must thus be insulated from the robot structure.

It is known that in order to electrically insulate a welding gun, this should be attached to the tool holder via blocks and/or plates of an electrically insulating material which is resistant to deformation, such as, for example, bakelite. However, the mechanical joint must withstand great loads. A spot welding gun has a weight of close to 100 kg, which, during acceleration and deceleration of the robot, causes considerable stresses on the mechanical joint. Usually, these blocks are designed and manufactured by the individual user and are adapted to different tools. This method is costly for the user and the designed joint may become too weak, with an ensuing risk of the welding gun getting detached.

SUMMARY OF THE INVENTION

The object of the invention is to produce an industrial robot with a tool holder which eliminates the above-mentioned problems and disadvantages. The tool holder is to exhibit an electrical insulation between the tool holder and the robot, so that harmful leakage currents cannot be passed through the robot. The industrial robot is to offer the user a tool holder, to which tools of various kinds, and in particular a spot welding gun, can be applied in a simple manner.

This is achieved according to the invention by an industrial robot with a tool holder which is characterized in that its turning disc is electrically insulated from the industrial robot and by a method with the characteristic features including arranging the turning disc to be electrically insulated from the robot. Advantageous embodiments are described in the characterizing parts belonging to the dependent claims.

A tool holder comprises a gear and a turning disc fixed to the output shaft of the gear. According to the invention, a thin insulating layer is applied between the output shaft and the turning disc, so that the turning disc becomes electrically insulated from the industrial robot. The turning disc is thus fixed to the output shaft with a screw joint. The screws are threaded in the shaft journal and lock the turning disc to the shaft by means of insulating washers. Guide means of insulating material are applied in the screw holes through the turning disc so that the screws are kept isolated from the turning disc.

BRIEF DESCRIPTION OF THE DRAWINGS

The invention will be explained in greater detail by description of an embodiment with reference to the accompanying drawings, wherein.

DETAILED DESCRIPTION OF THE PREFERRED EMBODIMENTS

Figure 1:
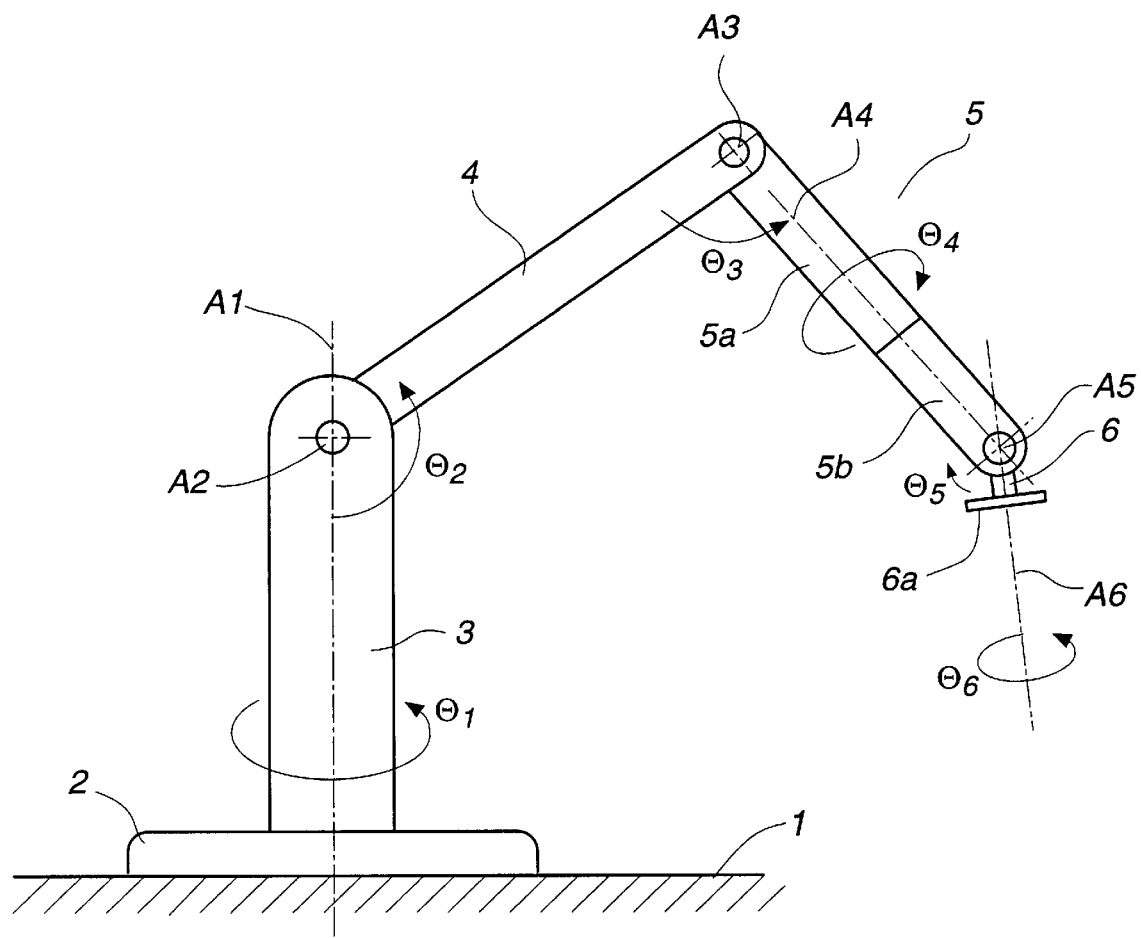
FIG. 1 shows the principle of a design of an industrial robot according to the invention.

FIG. 1 shows a known industrial robot comprising a tool holder 6a according to the invention. On a base 1 the foot 2 of the robot is fixedly mounted. The robot has a stand 3, which is rotatable in relation to the foot 2 around a vertical axis A1. At the upper end of the stand, a first robot arm 4 is journalled and rotatable in relation to the stand around a second axis A2. At the outer end of the arm, a second arm 5 is journalled and rotatable in relation to the first arm around an axis A3. The robot arm 5 comprises two parts 5a and 5b, whereby the outer part 5b is rotatable in relation to the inner part around an axis of rotation A4 coinciding with the longitudinal axis of the arm. At its outer end, the arm 5 supports a so-called robot hand 6, which is rotatable around an axis of rotation A5 perpendicular to the longitudinal axis of the arm. The robot wrist comprises a tool holder 6a. The outer part of the robot hand and hence the tool holder 6a are rotatable in relation to the inner part of the robot hand around an axis of rotation A6. The angles of rotation of the six axes of rotation A1 . . . A6 are designated $\Theta 1$ . . . $\Theta 6$.

Figure 2:
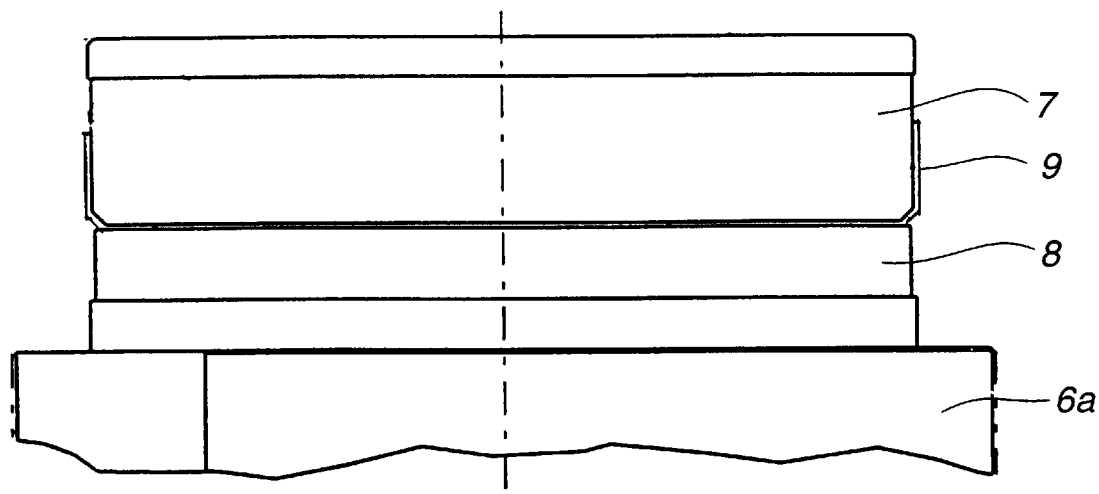
FIG. 2 shows a side view of a tool holder for an industrial robot.

A side view of the outer part of the robot hand is shown in FIG. 2. A turning disc 7 is secured to the output shaft 8 of the robot hand 6a. Between the turning disc 7 and the shaft journal 8, an electrically insulating layer 9 is arranged. To counteract that metallic objects cause a short circuit in the region around the joint, the insulating layer is drawn up along the sides of the turning disc. The insulating collar also permits the creepage distance to be increased, so that leakage currents are prevented in case of coatings of moisture and dirt.

Figure 3:
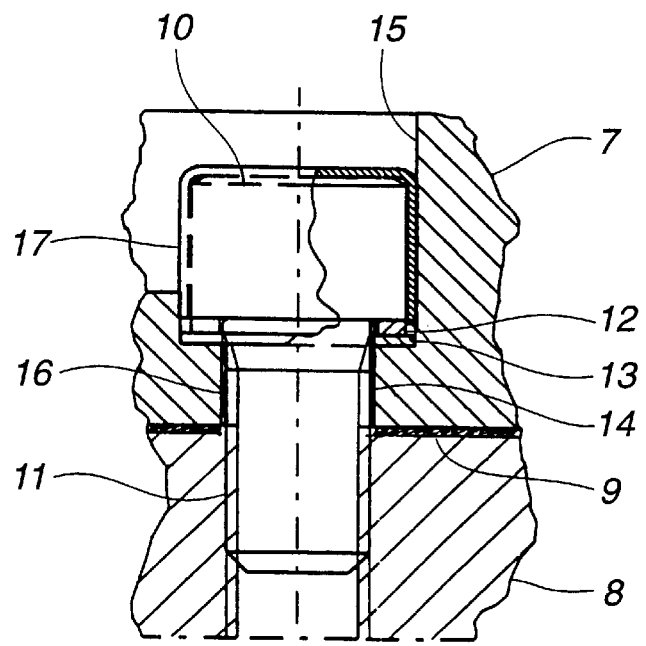
FIG. 3 shows a section of a screw joint between the turning disc and the shaft journal.

The turning disc is attached to the shaft journal with a plurality of screw joints, the fundamental appearance of which is shown in more detail in FIG. 3. A screw comprising a screw head 10 and a threaded tap 11 is arranged so as to be screwed into the shaft journal 8. The turning disc 7 exhibits a recess 15 at the screw joint, the purpose of the recess being to countersink the screw so that tools can be easily attached to the turning disc. In the recess, a through-hole 16 is provided, through which the threaded part of the screw penetrates. With its lower flange, the screw head 10 presses the turning disc 7 against the shaft journal 8. A washer 12 of hardened steel is adapted to transmit the force from the screw head. To maintain an electrical insulation between the screw head and the turning disc also in the screw joint, an insulating washer 13 is arranged between the washer 12 and the shaft journal 8.

The screw, which is in galvanic contact with the shaft journal, is laterally insulated from the turning disc by an insulating sleeve 14 on the inside of the hole 16. To prevent moisture from penetrating down between the sides of the recess 15 and the very screw head 10, the screw head is covered with an insulating cap 17. The cap 17 is preferably made of an elastic material and formed so as to completely cover the screw head and also to seal against the steel washer 12 and the insulating washer 13.

In a preferred embodiment, the insulating layer is applied to the turning disc as a thin layer of aluminium oxide. The insulating layer is applied to the turning disc by plasma spraying. The method permits the layer to easily follow the contour of the turning disc and thus to be easily arranged to form an insulating collar around the turning disc. The color of the material is white, which permits an ocular inspection of the insulation. The insulation is to withstand a potential difference of 100 V alternating current for 60 seconds. This is to be fulfilled in an environment with a relative humidity of close to 95%. To this end, the insulating layer is impregnated to better withstand moisture.

We claim:

1. An industrial robot comprising a plurality of robot arms which are movable in relation to each other, the arms supporting a tool holder with a turning disc, the turning disc being attached to an output shaft journal of the tool holder, the turning disc being electrically insulated from the industrial robot by an insulated layer provided between said turning disc and said shaft journal.

2. An industrial robot according to claim 1, wherein said insulating layer is drawn up around the sides of the turning disc to form a collar.

3. A method in an industrial robot with a plurality of robot arms movable in relation to each other and which support a tool holder comprising an output shaft journal and a turning disc to bring about a electrical insulation between a tool, applied to the tool holder, and the robot, said method including electrically insulating the turning disc from the industrial robot by providing an insulated layer between said turning disc and said shaft journal.

4. A method according to claim 3, including extending said insulating layer up around the sides of the turning disc to form a collar.

5. A method for arranging an insulating layer according to claim 3, wherein said insulating layer is applied to the turning disc by means of plasma spraying.

\* \* \* \* \*